(12) United States Patent
Kitsukawa et al.

(10) Patent No.: US 7,493,636 B2
(45) Date of Patent: Feb. 17, 2009

(54) METHOD AND APPARATUS FOR PROVIDING ELECTRONIC COUPONS

(75) Inventors: Tadamasa Kitsukawa, Wyckoff, NJ (US); Andrew M. Proehl, New York, NY (US); Gong Szedo, New York, NY (US); Keiichi Totsuka, Weehawken, NJ (US)

(73) Assignee: Sony Corporation/Sony Electronic Inc., Tokyo (JP)

( * ) Notice: Subject to any disclaimer, the term of this patent is extended or adjusted under 35 U.S.C. 154(b) by 708 days.

(21) Appl. No.: 11/186,299

(22) Filed: Jul. 20, 2005

(65) Prior Publication Data

US 2006/0015893 A1   Jan. 19, 2006

Related U.S. Application Data

(63) Continuation of application No. 09/218,120, filed on Dec. 21, 1998, now abandoned.

(51) Int. Cl.
*H04N 7/16* (2006.01)
(52) U.S. Cl. .......................................... 725/23; 705/14
(58) Field of Classification Search ................... 705/14; 725/23
See application file for complete search history.

(56) References Cited

U.S. PATENT DOCUMENTS 5,287,181 A * 2/1994 Holman ...................... 348/473

OTHER PUBLICATIONS

Kevin Savetz, 1998, http://www.savetz.com/articles/nie40.html.*

* cited by examiner

*Primary Examiner*—Hunter B. Lonsberry
(74) *Attorney, Agent, or Firm*—Blakely, Sokoloff, Taylor & Zafman LLP

(57) ABSTRACT

Electronic coupons are provided for items comprising products and services. The coupon information is received along with broadcasts of associated television programs. Selected coupon modes alert a viewer when coupon information is available for an item. The viewer alert comprises displayed marks superimposed over the broadcast of the television program. The displayed marks comprise indicators for each item for which coupon data is available, and the indicators may be representative of the items to which the indicators correspond. The coupon information for a particular item is selected when the viewer selects the indicator corresponding to the item in which the viewer is interested. Upon selection, the coupon information is displayed along with the broadcast of the currently selected television program. Coupon information may be selected for storage on a removable recording medium along with data corresponding to the television program with which the coupon information is associated. The coupon information is redeemed by the viewer by a merchandise retailer or dealer.

20 Claims, 11 Drawing Sheets

METHOD AND APPARATUS FOR PROVIDING ELECTRONIC COUPONS

RELATED APPLICATIONS

This is a continuation of application Ser. No. 09/218,120 filed on Dec. 21, 1998 now abandoned.

FIELD OF THE INVENTION

The present invention relates to television broadcasting, and, specifically to providing on-demand electronic advertising information and coupon information along with broadcasts of television programs.

BACKGROUND OF THE INVENTION

Television broadcasting technology has improved tremendously since its inception. Today, television signals are broadcasted on the airwaves, through cables, and via satellite. The number of stations and programs accessible today has increased to hundreds of stations. Consequently, the television broadcast systems have increased in complexity in order to present the information on the hundreds of stations to the viewer.

The current generation of complex broadcasting system technology provides the viewer with many options regarding the functions of the broadcasting system and the programs that are available for broadcast. These options include, but are not limited to, choices in presentation graphics, program directories that allow for channel surfing among program descriptions while watching a particular program on one channel, custom user-formatted menus, message receipt functions from a service provider, on-demand selection of pay-per-view broadcasts, selection of a broadcast for automatic recording, and programming a broadcast system to tune to a preselected station at a designated time. These broadcasting system options are typically accessed through graphical user interfaces.

While the broadcast system technology improvements provide viewers with more programming selections and better picture and sound quality, these improvements provide retailers and service providers, the supporters of the broadcast system, with an improved medium over which to advertise their products. Retailers and service providers typically derive a benefit from the improved medium because the improved quality of the signals and the programming draw a larger audience, thereby providing them with a larger potential customer base. In spite of the larger potential customer base, there remains a need for an advertising system that better enables retailers and service providers to target customers with more product information and incentive to purchase than is provided with typical commercial segments. Furthermore, as a large number of homes contain personal computers, many of which are used to electronically purchase products and services via direct modem or Internet connections, there is a need to provide potential customers with product information and incentive to purchase that exploits the convenience of electronic purchasing.

The success of the combination of targeted advertising and electronic purchasing is best demonstrated by the financial success of the typical home shopping networks. The typical home shopping network provides products for which they present detailed advertising information and allow for electronic purchasing. This is a form of on-demand advertising because when a viewer wants to shop, the viewer can tune in a home shopping network of their choice, and when the viewer tires of shopping, the viewer can tune to a different network or station. The on-demand nature of the home shopping networks is appreciated by the typical viewer.

One form of advertisement that is very successful is the provision of coupons issued by manufacturers, retailers, and service providers that allow the consumer to save money on particular products during particular times. Typically, coupons are published in magazines and newspapers, and the consumer acquires the coupons by purchasing the magazine or newspaper. In the alternative, consumers are issued a coupon card by a particular retailer, wherein presentation of the coupon card, or electronic coupon, automatically allows the consumer to take advantage of reduced prices on particular goods without having to present coupons corresponding to the particular goods. However, there is a need for providing coupons that are compatible with electronic purchasing methods and which are accompanied by more detailed product information.

SUMMARY OF THE INVENTION

A method and apparatus for providing electronic coupons are provided. According to one aspect of the invention, coupon information is provided for items comprising products and services. The products and services may be used in scenes of live and prerecorded television programs. The scenes comprise currently displayed scenes, previously displayed scenes, and scenes that are to be displayed in the future. The coupon information is received along with broadcasts of associated television programs. The coupon information may be received simultaneously with the scenes in which items corresponding to the coupon information appear. Furthermore, the coupon information may be received prior to receipt of the scenes or television programs in which the items corresponding to the coupon information appear, in which case the coupon information is stored.

When a coupon mode is selected, the viewer is alerted when coupon information is available for an item. The viewer alert comprises a tone and at least one displayed mark, wherein the displayed marks may be superimposed over the broadcast of the television program on the screen. The displayed marks comprise an indicator for each item for which coupon data is available, and the indicators may be representative of the items to which the indicators correspond.

The coupon information for a particular item is requested when the viewer selects the indicator corresponding to the item in which the viewer is interested. Upon request, the coupon information is displayed on a display along with the broadcast of the currently selected television program. The coupon information may be displayed by superimposing the information over the broadcast of the television program on the screen.

Coupon information may be selected for storage on a removable recording medium comprising integrated circuit cards, or "smart" cards, magnetic medium, and optical medium. Furthermore, data corresponding to the television program with which the coupon information is associated is stored on the removable recording medium along with the coupon information. The coupon information may be used to electronically order an associated item. The coupon information is redeemed by the viewer when the stored coupon information is read from the removable recording medium by a merchandise retailer or dealer.

In addition to the coupon information, advertising information may be provided to a viewer for selected items. The advertising information is received along with the broadcast of a television program. When an advertising mode is selected, the viewer is alerted when the advertising information is available. Selected advertising information is displayed along with the broadcast of a television program.

These and other features, aspects, and advantages of the present invention will be apparent from the accompanying drawings and from the detailed description and appended claims which follow.

BRIEF DESCRIPTION OF THE DRAWINGS

The objects, features, and advantages of the present invention will be apparent to one skilled in the art from the following detailed description in which.

DETAILED DESCRIPTION OF THE INVENTION

In the method and apparatus of the present invention the broadcast system described in one embodiment is a direct broadcast satellite system. However, it is readily apparent to one skilled in the art that other processor-based systems that use on-screen menus may use the method and apparatus of the present invention. Furthermore, it is readily apparent to one skilled in the art that other broadcast systems which have the capability of receiving and displaying a multiplicity of stations may utilize the method and apparatus of the present invention.

In the following description, for purposes of explanation, numerous details are set forth, such as menus, flowcharts and system configurations, in order to provide a thorough understanding of the present invention. However, it will be apparent to one skilled in the art that these specific details are not required in order to practice the present invention. In other instances, well known electrical structures and circuits are shown in block diagram form in order not to unnecessarily obscure the present invention.

It is readily apparent to one skilled in the art that additional functions can be added to the process and functions modified or removed and still be within the spirit and scope of the invention. The system provides an innovative and user friendly access to a wealth of information regarding goods and services available through the broadcasting system, wherein the broadcasting system comprises high-definition television systems. In the present invention a number of functions are selectable through the remote control device. It is apparent that these functions may be selectable through other devices such as a joystick or other means such as an on screen menu.

Figure 1:
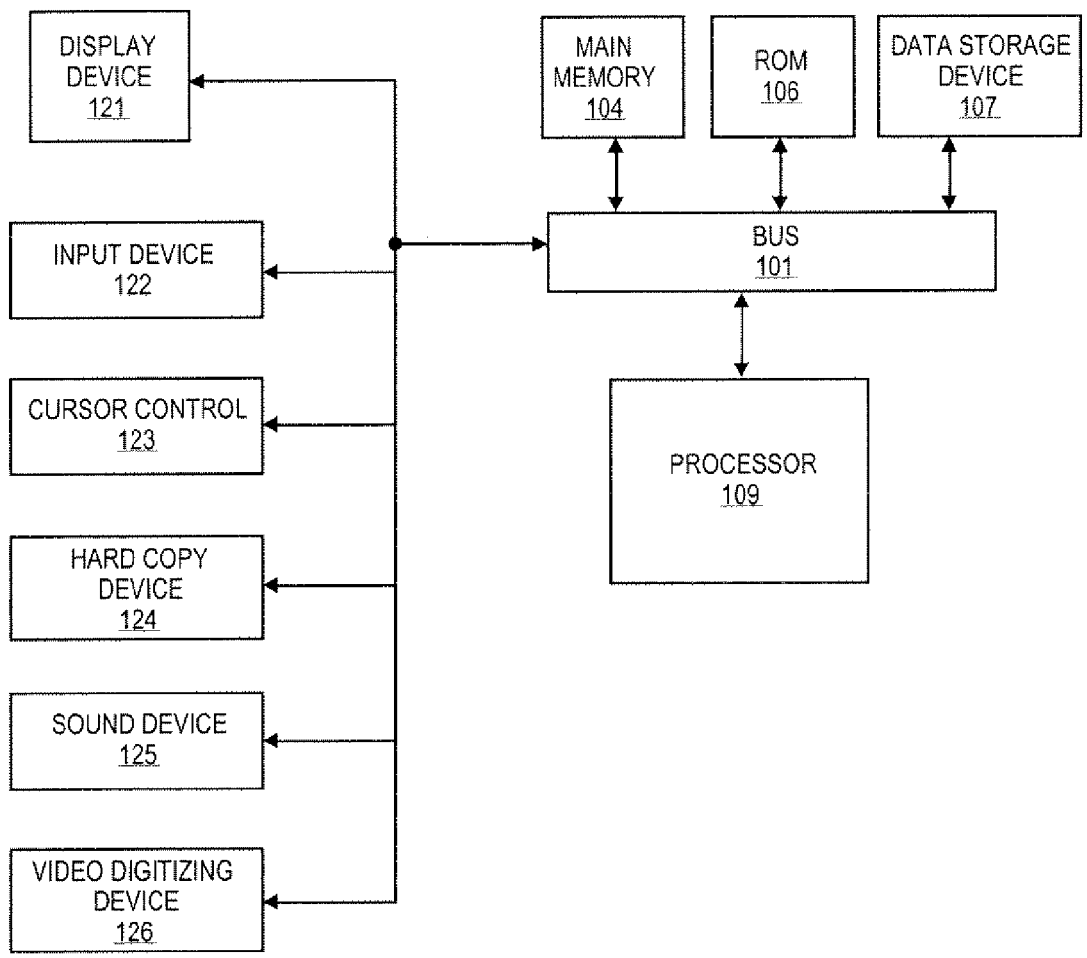
FIG. 1 is a computer system using one embodiment of the present invention.

FIG. 1 is a computer system 100 using one embodiment of the present invention. The computer system 100 comprises a bus 101, or other communications hardware and software, for communicating information, and a processor 109 coupled to the bus 101 for processing information. The processor 109 represents a central processing unit (CPU) having any type of architecture. The computer system 100 further comprises a random access memory (RAM) or other dynamic storage device in main memory 104 coupled to the bus 101 for storing information and instructions to be executed by the processor 109. The computer system 100 further comprises a read only memory (ROM) 106, or other static storage device, coupled to the bus 101 for storing static information and instructions for the processor 109.

A data storage device 107, such as a magnetic disk or optical disk and a corresponding disk drive, is coupled to the bus 101. The computer system 100 may be coupled via the bus 101 to a display device 121 for displaying information to a user of the computer system 100. Display device 121 can include a frame buffer, specialized graphics rendering devices, a cathode ray tube (CRT), and a flat panel display, but the embodiment is not so limited. An alphanumeric input device 122, including alphanumeric and other keys, may be coupled to the bus 101 for communicating information and command selections to the processor 109. Another type of user input device is a cursor control 123 comprising a mouse, a trackball, a pen, a touch screen, or cursor direction keys for communicating direction information and command selections to the processor 109, and for controlling cursor movement on the display device 121.

In one embodiment, a hard copy device 124 is coupled to the bus 101 and is used for printing instructions, data, and other information on a medium such as paper, film, or similar types of media. Additionally, the computer system 100 can be coupled to a sound device for sound recording and playback 125. The computer system 100 can function as a terminal in a computer network, wherein the computer system 100 is a computer subsystem of a computer network, but the embodiment is not so limited. The computer system 100 may further include a video digitizing device 126. The video digitizing device 126 can be used to capture video images that can be transmitted to other computer systems coupled to the computer network.

Figure 2:
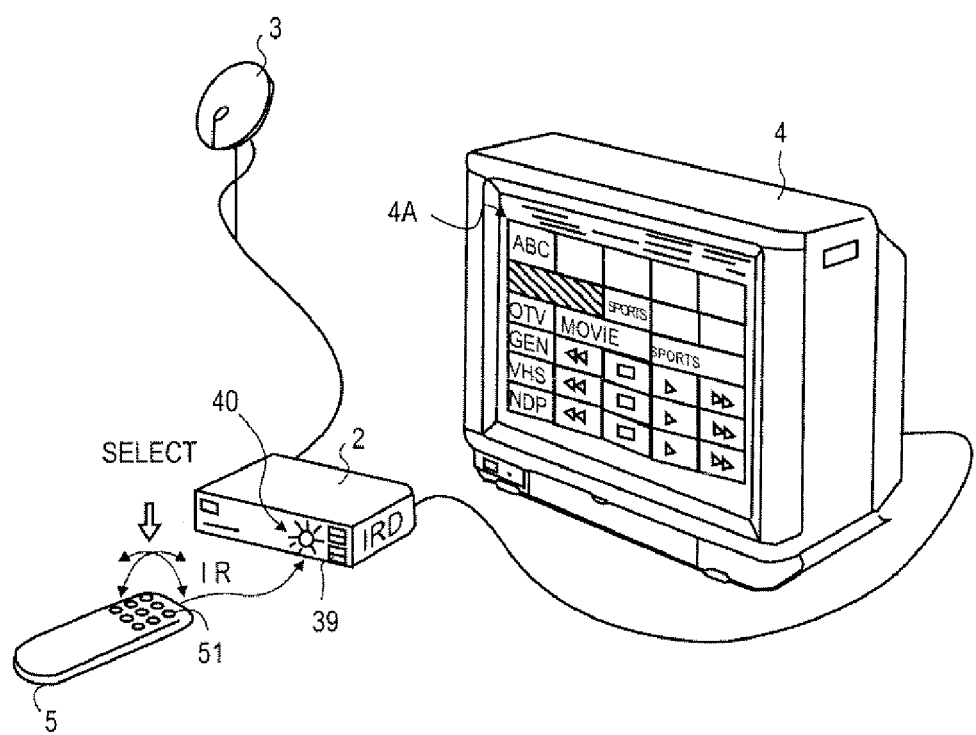
FIG. 2 is a diagram of a Direct Satellite System (DSS) of one embodiment of the present invention.

FIG. 2 is a diagram of a Direct Satellite System (DSS) of one embodiment of the present invention. The system has an antenna 3, an integrated receiver/decoder 2 (IRD), a remote controller 5, and a monitor 4. Packets of data are transmitted by a transponder on the satellite. Each transponder transmits data in a time share manner at a predetermined frequency. The antenna 3 receives an encoded data signal sent from a satellite. The data is received in encrypted and encoded, or compressed, form. The antenna 3 has a low noise block down converter 3a (LNB). The LNB 3a converts a frequency of a signal sent from the satellite to another frequency. The converted signal is supplied to the IRD 3. A tuner 21 of a decoder is tuned in to the frequency of the transponder corresponding to a channel, which is designated by a viewer so that the packets of digital data are received by the decoder. The received encoded signal is decoded by the IRD. The monitor 4 receives a signal from the IRD 3.

Figure 3:
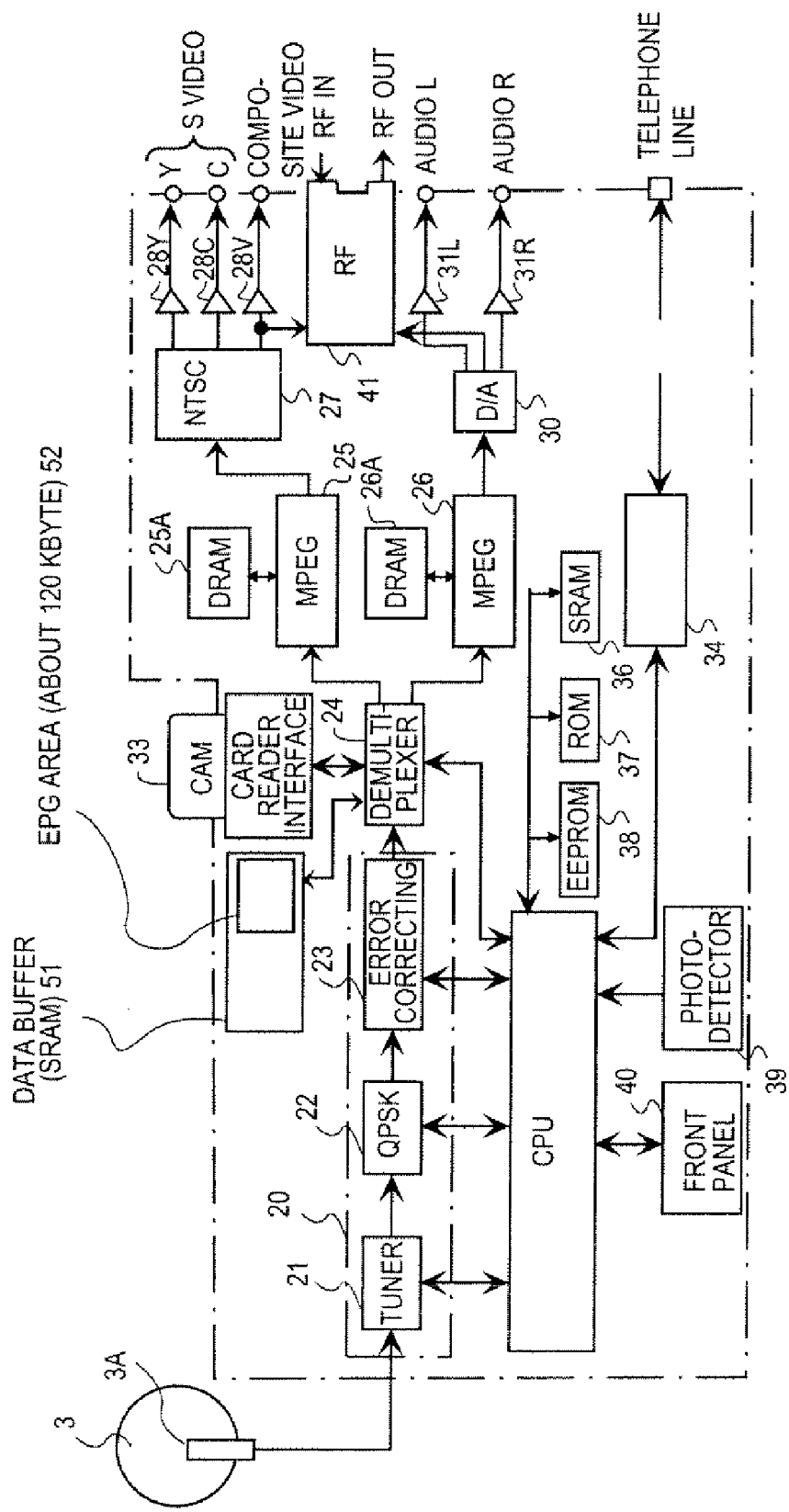
FIG. 3 is a block diagram of an IRD of one embodiment of the present invention.

FIG. 3 is a block diagram of the IRD of one embodiment of the present invention. A radio frequency (RF) signal output from the LNB 3a of the antenna 3 is supplied to a tuner 21. The output from the tuner 21 is supplied to a quadrature phase shift keying (QPSK) demodulation circuit 22 for demodulation. The output from the QPSK demodulation circuit 22 is supplied to an error correcting circuit 23 for error correction. A transport IC 24 or demultiplexer receives the data stream, consisting of packets of data, from the error correcting circuit 23 and directs portions of the data stream to the appropriate circuit for processing.

The digital data stream sent from a satellite includes headers for classifying the different portions of the data in the digital data stream. The transport IC stores the headers in registers and uses the headers to direct the data. The data stream sent from the satellite includes video data in the format specified by the Motion Pictures Expert Group standard (MPEG), MPEG audio data, electronic programming guide (EPG) data or electronic menu data, on-demand advertising data, and electronic coupon data. Data that is identified by its header to be video data is transferred to an MPEG video decoder 25. Data that is identified by its header to be audio data is transferred to an MPEG audio decoder 26. Similarly, data having a header that identifies the data to be EPG data is transferred to a predetermined area in the data buffer 51 designated to store the EPG or electronic menu. Similarly, data having a header that identifies the data to be on-demand advertising data and electronic coupon data is transferred to a predetermined area in the data buffer 51. The MPEG video decoder 25 decodes the video signal received from the transport IC. Dynamic random access memory (DRAM) 25a, connected to the MPEG video decoder 25, is used for buffering and storage of video data during processing by the MPEG video decoder. The MPEG audio decoder 26 decodes the digital audio signal. The DRAM 26a, connected to the MPEG audio decoder 26, is used for buffering of data and information during processing by the MPEG audio decoder 26.

The CPU 29 is the central control mechanism and executes code stored in the ROM 37 to perform certain functions of the system. For example, the CPU processes certain data to control the generation of the on-demand advertising data and coupon data in accordance with the teachings of the present invention. Furthermore, the CPU receives and processes the user input, received from the front panel buttons or switches 40 and the photodetector circuit 39, to provide the user functionality and access to the system described herein. A remote controller may be utilized by the user to transmit commands and make program selections in accordance with the teachings of the present invention. Moreover, the CPU accesses user settings and preferences for processing of information and configuration of the system. The user settings are stored in the non-volatile memory, such as electrically erasable programmable read-only memory (EEPROM) 38. The CPU further maintains a list of pointers, stored in static random access memory (SRAM) 36, to the channel information and program information as well as the advertising and coupon data stored in the SRAM 51. Thus, when a user wishes to display a form of the advertising data or coupon data on the screen, the CPU 29, accessing pointers stored in the SRAM 36, communicates to the transport IC 34 to retrieve the data from the data buffer (SRAM) 51 identified by the pointers. The CPU then formulates the format and other digital data which forms the associated information on the screen and forwards the data representative of the associated information to the transport IC 34 which forwards the data to the DRAM 25a of the MPEG video decoder 25 for subsequent output to the screen.

The broadcasting system of one embodiment provides the viewer with programming information for a number of broadcasting stations, as well as providing the viewer with many options regarding the functions of the broadcasting system and the programs that are available for broadcast. These options allow for the controlled presentation of on-demand advertising information and electronic coupon information using an electronic program guide. These options further include, but are not limited to, choices in presentation graphics, program directories that allow for channel surfing among program descriptions while watching a particular program on one channel, custom user-formatted menus, message receipt functions from a service provider, on-demand selection of pay-per-view broadcasts, selection of a broadcast for automatic recording, and programming a broadcast system to tune to a preselected station at a designated time. These broadcasting system options are accessed through graphical user interfaces in the form of on-screen menus. The broadcasting system described herein provides an on-screen menu display that enables the user to easily access and manipulate the functions of the system.

Figure 4:
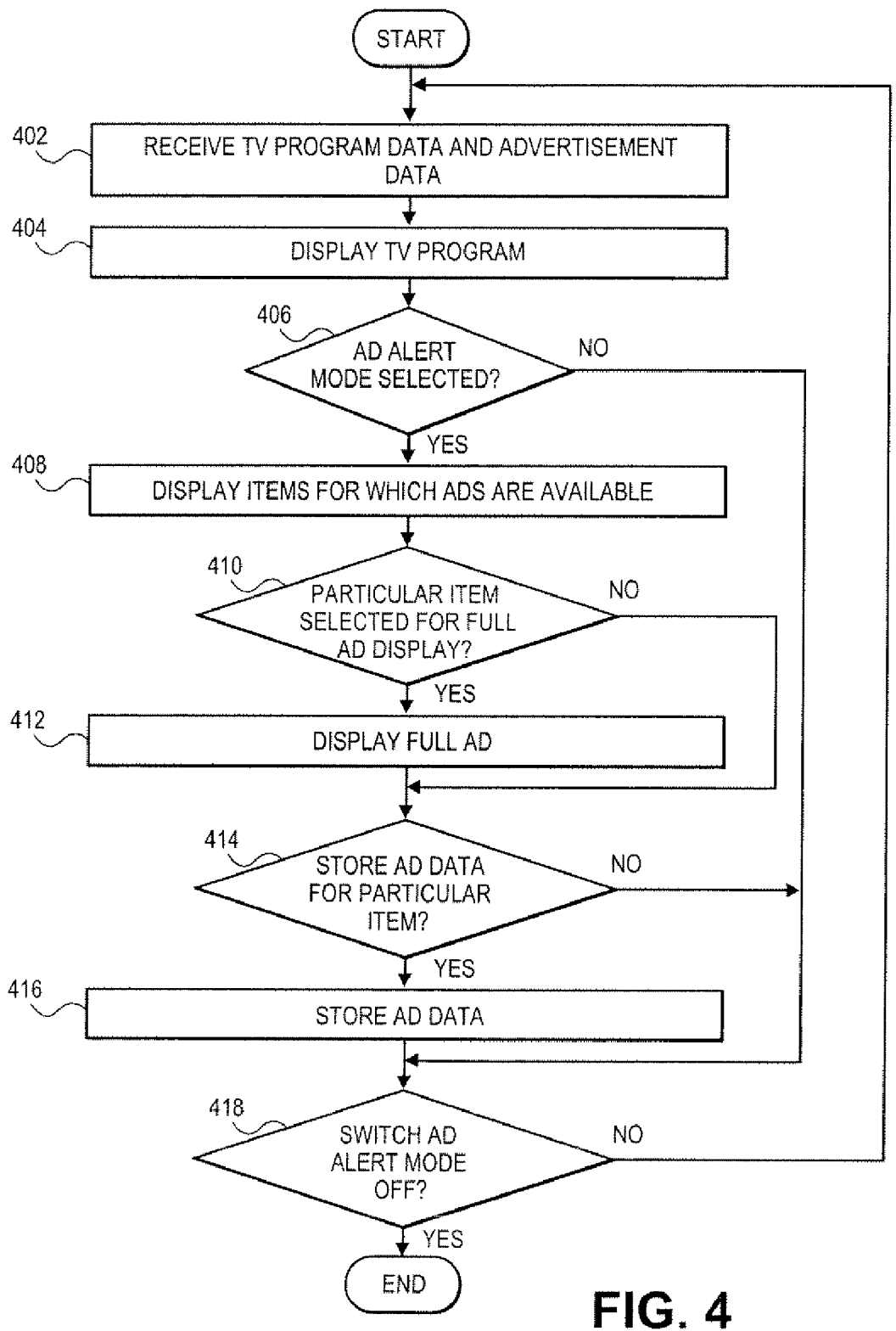
FIG. 4 is a flowchart of a method for providing on-demand advertising of one embodiment of the present invention.

FIG. 4 is a flowchart of a method for providing on-demand advertising of one embodiment of the present invention. Operation begins at step 402, at which advertising information is received along with broadcasts of associated television programs. According to one aspect of the invention, advertising information is provided for items comprising products and services used in scenes of live and prerecorded television programs and live and prerecorded television commercials. The scenes comprise currently displayed scenes, previously displayed scenes, and scenes that are to be displayed in the future, but the embodiment is not so limited. The advertising information may be received simultaneously with the scenes in which the identified items corresponding to the advertising information appear, but the embodiment is not so limited. Furthermore, the advertising information may be received prior to receipt of the scenes or television programs in which the identified items corresponding to the advertising information appear, in which case the advertising information is stored along with timing data that links the advertising information to the corresponding scene or program. The television program is displayed, at step 404.

In accessing the advertising information, one of a number of display modes are selected by a viewer or user. The display modes of one embodiment comprise an advertisement mode, a stored advertisement mode, and a non-advertisement mode, but the embodiment is not so limited. The advertisement mode enables display of the advertising information. The stored advertisement mode results in the storing of the advertising information for presentation at a later time. The non-advertisement mode prevents display of the advertising information. A determination is made, at step 406, whether an advertisement mode is selected. If an advertisement mode is not selected, operation continues at step 418. If an advertisement mode is selected, operation continues at step 408, at which the viewer is alerted when advertising information is available for an item displayed in a scene of the television program broadcast. The viewer alert comprises a tone and at least one displayed mark, wherein the displayed mark may be superimposed over the broadcast of the television program on the screen, but the embodiment is not so limited. The displayed mark of one embodiment comprises an indicator for each item for which advertising data is available, and the indicators may be representative of the items to which the indicators correspond, but the embodiment is not so limited.

Operation continues at step 410, at which the advertising information for a particular item may be selected, or requested, when the viewer selects the indicator corresponding to the item in which the viewer is interested. The selection may be performed using a cursor or pointer, but the embodiment is not so limited. If advertising information is selected for display by the viewer, operation continues at step 412, at which the advertising information is displayed along with the broadcast of the currently selected television program. The advertising information may be displayed by superimposing the information over the broadcast of the television program on the screen, but the embodiment is not so limited. Furthermore, the advertising information may be displayed on a portion of the display along with the television program broadcast, wherein either the advertising information or the television program is displayed on a picture-in-a-picture inset, but the embodiment is not so limited. Following display of the full advertisement at step 412, operation continues at step 414.

If advertising information is not selected for display by the viewer, operation continues at step 414, at which advertising information for particular items may be stored. If the advertising information is not selected for storage, operation continues at step 418. If the advertising information is selected for storage, operation continues at step 416, at which the advertising information is stored. The stored advertisement mode of one embodiment causes specified portions of the advertising information to be stored. The stored advertising information may be recalled and viewed at a time that is different from the display time of the scene in which the corresponding advertised item appears, but the embodiment is not so limited.

Following storage, a determination is made as to whether the advertisement mode remains selected. If an advertisement mode remains selected, operation continues at step 402 and proceeds as previously detailed. If the advertisement modes are deselected, operation ends as selection of the non-advertisement mode prevents the display of advertising information to the viewer.

Figure 5:
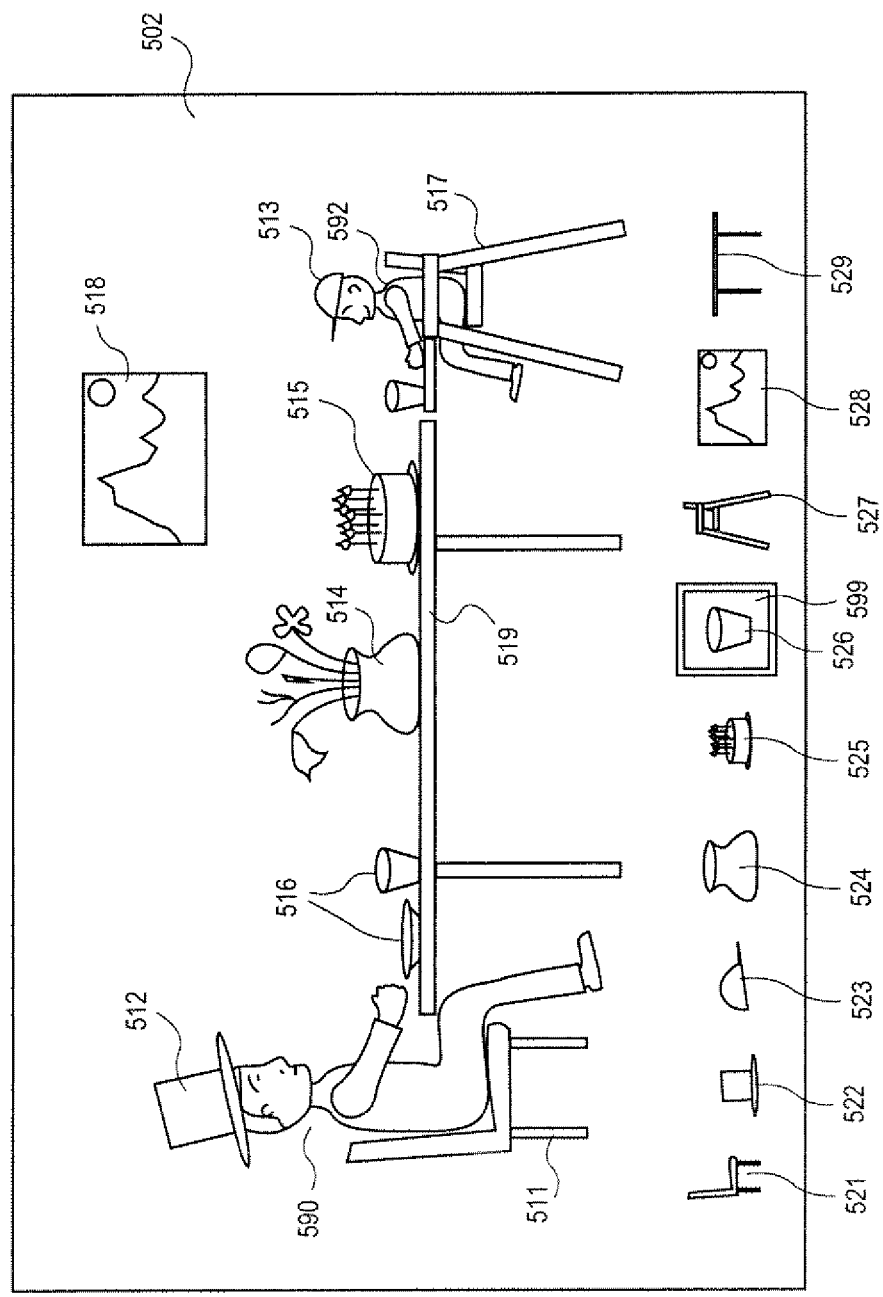
FIG. 5 is a television program scene displayed along with advertising information alerts of one embodiment of the invention.

FIG. 5 is a television program scene 502 displayed along with advertising information alerts 521-529 of one embodiment of the invention. In one embodiment, the broadcasting system comprises three operating modes, but the embodiment is not so limited. A first mode, the advertisement mode, enables the display of advertising information and corresponding advertising alerts, but the embodiment is not so limited. A second mode, the stored advertisement mode, causes the received advertising information to be stored, but the embodiment is not so limited. The stored advertisement mode causes advertising information received both simultaneously and prior to receipt of the corresponding scene or program to be stored. As advertising information received prior to the time of the corresponding scene or program broadcast time comprises timing data that links the advertising information to the corresponding scene or program, the timing data is stored along with the advertising information. The stored advertising information may be recalled and viewed at a time that is different from a display time of a scene in which the corresponding advertised item appears. A third mode, the non-advertisement mode, prevents the display of adverting information and corresponding advertising alerts, but the embodiment is not so limited.

In the example that follows, the advertisement mode is selected in the broadcasting system, thereby enabling the display of advertising information, but the embodiment is not so limited. The program scene 502 is one in which an adult actor 590 and a child actor 592 are enjoying a meal. The program scene 520 may be from a live television program or a prerecorded television program, but the embodiment is not so limited. Advertising information is provided for numerous items 511-519 present in the program scene 502, as indicated by the displayed advertising marks 521-529. When advertising information is available for a particular item, a corresponding advertising mark will be displayed on the screen. The advertising mark may be accompanied by a viewer-controlled alert tone, but the embodiment is not so limited. The displayed advertising marks may be superimposed over the program scene on any portion of the display screen, but the embodiment is not so limited. In an alternate embodiment, a portion of the display screen is allocated to contain the displayed marks, but the embodiment is not so limited.

In one embodiment, the advertising marks are representative of the items to which the marks correspond. For example, the advertising marks may be some combination of alphanumerics and icons representative of the item, but the embodiment is not so limited. The advertising information for a particular item is selected for display by moving a cursor 599 or other pointer to the corresponding advertising mark and selecting the mark. The cursor control comprises a remote control device and a mouse, but the embodiment is not so limited. The advertising information displayed for an item may comprise, but is not limited to, manufacturer's information, dealer information, service information, specification information, cost information, and availability. In one embodiment, the advertising information may comprise electronic catalogs that contain information on additional products and services offered by the particular manufacturer and dealer, electronic links to electronic catalogs, electronic links to product manufacturers and dealers that comprise electronic mail and voice messaging links, and electronic links over the Internet to the Web pages of product manufacturers and dealers, but the embodiment is not so limited.

In the displayed program scene 502, for example, advertising information is available for the chair 511 in which the actor 590 is sitting by selecting the corresponding chair icon advertising mark 521. Advertising information is available for the hat 512 worn by the actor 590 by selecting the corresponding hat icon advertising mark 522. Advertising information is available for the hat 513 worn by the child actor 592 by selecting the corresponding hat icon advertising mark 523. Advertising information is available for the flower arrangement 514 by selecting the corresponding vase icon advertising mark 524. Advertising information is available for the cake 515 by selecting the corresponding cake icon advertising mark 525. Advertising information is available for the dishware 516 by selecting the corresponding dishware icon advertising mark 526. Advertising information is available for the highchair 517 by selecting the corresponding highchair. icon advertising mark 527. Advertising information is available for the artwork 518 by selecting the corresponding artwork icon advertising mark 528. Advertising information is available for the table 518 by selecting the corresponding table icon advertising mark 528.

As an alternative to providing an advertising mark for each item for which advertising information is available, advertising marks may be displayed for general categories of items. For example, all clothing items of a scene for which advertising information is available may be grouped together to be accessed using one general clothing icon, but the embodiment is not so limited. Selecting the clothing icon results in a display comprising a list of each clothing item for which advertising information is available. Selecting an article of clothing from the list results in display of the specific information pertaining to the selected article of clothing.

In another alternate embodiment, a single generic advertising mark may be used to indicate that advertising information is available for at least one item of a scene. Selecting the advertising mark with a cursor or pointing device presents a list of items superimposed over the displayed program broadcast for which advertising information is available. The viewer may then move the cursor to highlight particular items of interest, whereupon selection of a particular item results in a second display comprising particular advertising information about that product.

Figure 6:
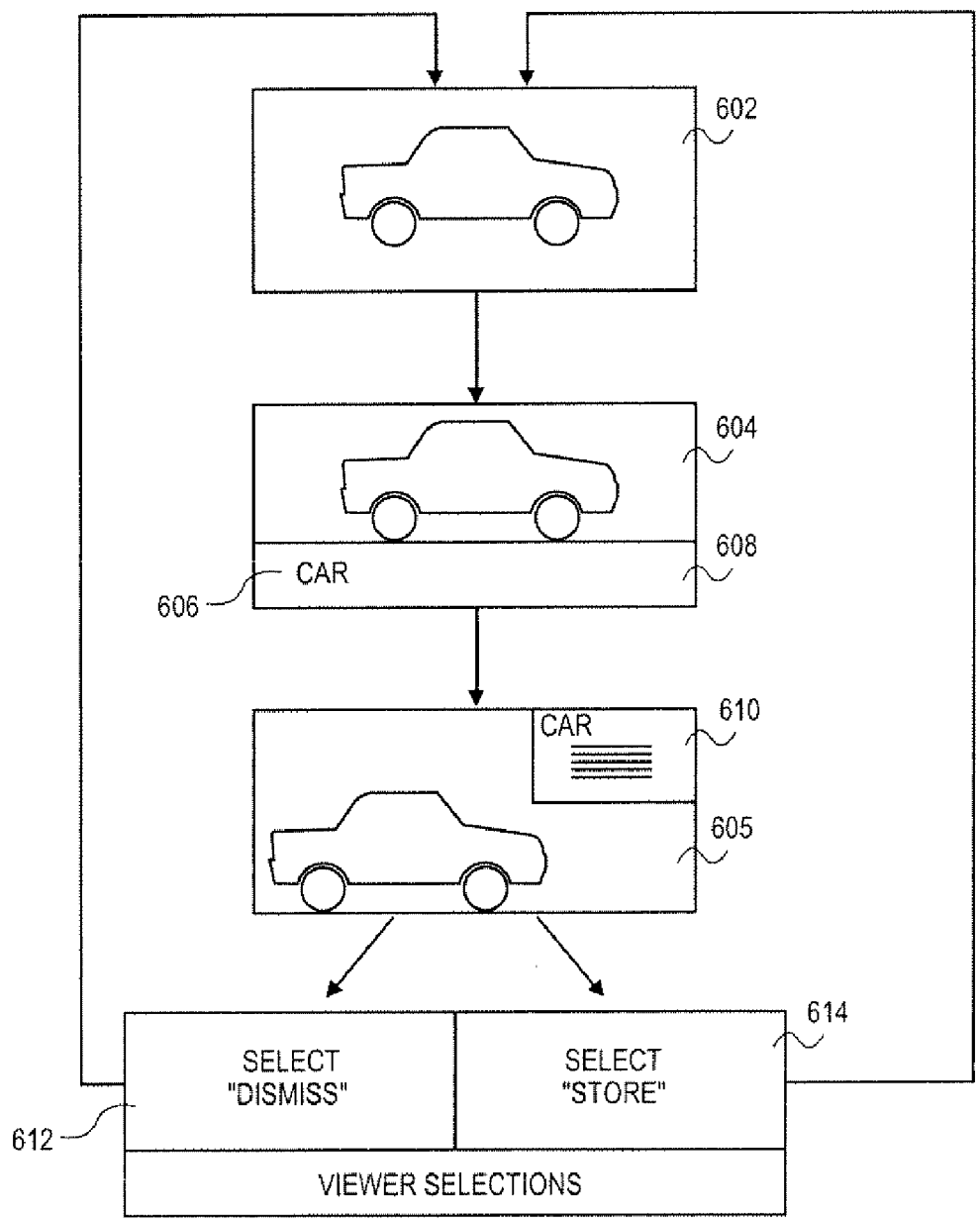
FIG. 6 is a sequence of displays of program scenes displayed along with advertising information alerts and advertising information of one embodiment of the invention.

FIG. 6 is a sequence of displays of program scenes displayed along with advertising information alerts and advertising information of one embodiment of the invention. The first display 602 is a program scene depicting an automobile. When the advertisement mode is selected, in the second display 604, an advertising mark "CAR" 606 is displayed in a portion of the screen 608 reserved for advertising marks. Alternatively, the advertising mark 606 could be superimposed over the program broadcast on the screen. The advertising mark is placed at any location on the screen as selected by the viewer, but the embodiment is not so limited. In a system in which an advertising mark is displayed for each item for which available, the advertising mark 606 indicates advertising information is available for the car. In a system in which a generic advertising mark is displayed for a category of goods and services, the advertising mark 606 indicates advertising information is available for goods and services that are associated with the car.

Following selection of the advertising mark 606, the corresponding advertising information 610 is displayed in the third display 605. The display of the advertising information 610 comprises superimposing the advertising information over the display of the program broadcast 602 and displaying the advertising information 610 in a prespecified or selected portion of the screen, but the embodiment is not so limited. Following display of the advertising information 610, the view is provided with two selections 612-614, but the embodiment is not so limited. The viewer may dismiss 612 the advertising information, wherein the advertising information is removed from the program broadcast 602. Furthermore, the viewer may store 614 the advertising information, wherein the advertising information is stored in a buffer or register for later retrieval and removed from the program broadcast 602.

Figure 7:
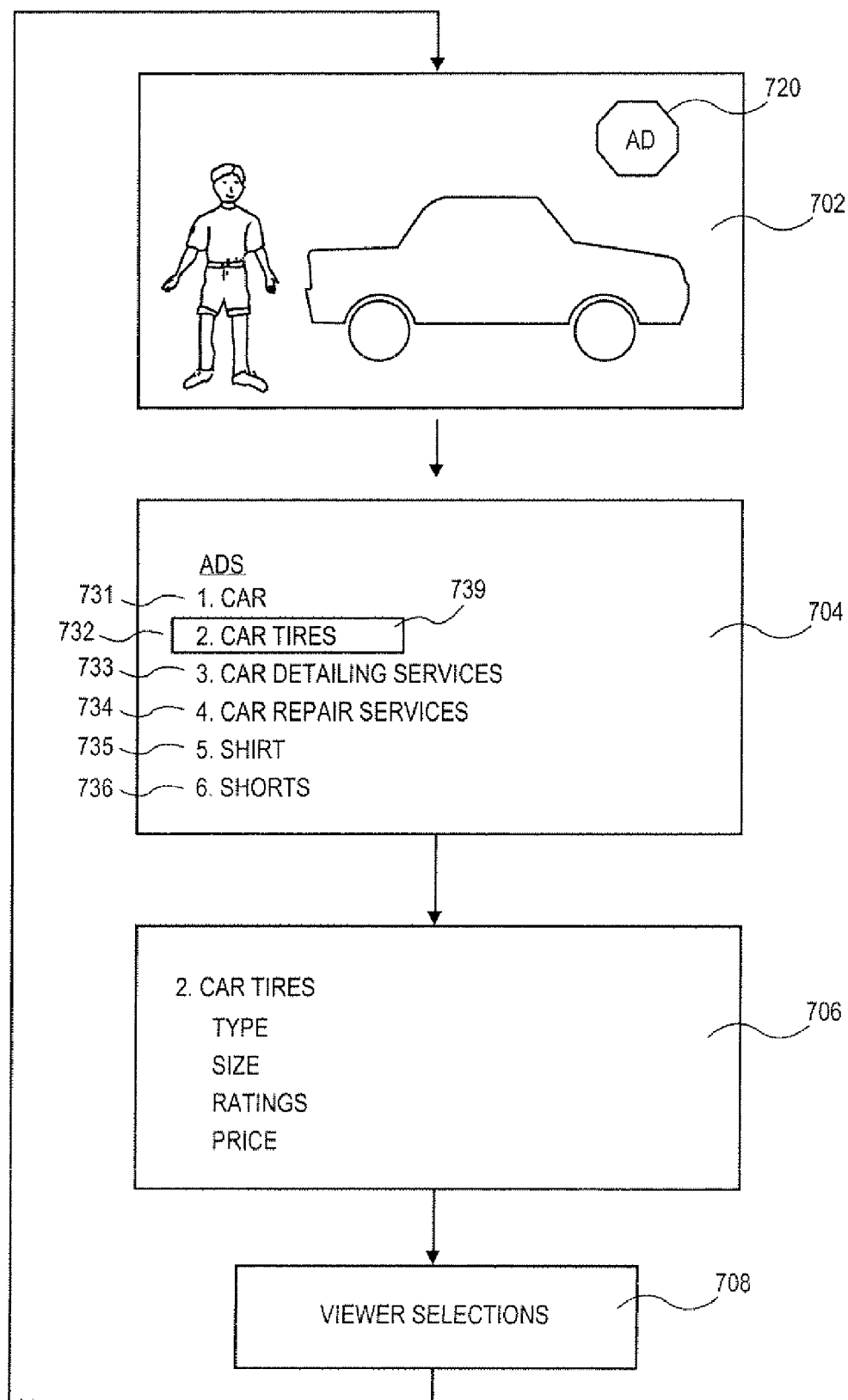
FIG. 7 is a sequence of television program scenes displayed along with advertising information alerts and advertising information of an alternate embodiment of the invention.

FIG. 7 is a sequence of television program scenes displayed along with advertising information alerts and advertising information of an alternate embodiment of the invention. The first program scene 702 depicts a person with an automobile. This example details a system in which a generic advertising mark is displayed to indicate advertising information is available for at least one of the goods and services depicted in a program scene, but the embodiment is not so limited. When the advertisement mode is selected, an advertising mark in the form of a general icon "AD" 720 is displayed in a portion of the screen reserved for the advertising mark. Alternatively, the advertising mark 720 may be superimposed over the program broadcast on the screen. The advertising mark is placed at any location on the screen as selected by the viewer, but the embodiment is not so limited.

Following selection of the advertising mark 720, the corresponding advertising information 704 is displayed. The display of the advertising information 704 comprises superimposing the advertising information over the display of the program broadcast 702 and displaying the advertising information 730 in a prespecified or selected portion of the screen, but the embodiment is not so limited. The advertising information 704 comprises information for the car 731, the car tires 732, car detailing services 733, car repair services 734, the shirt 735, and the shorts 736. A viewer-controlled cursor 739 or pointer is used to select advertising information on the car tires 732. The car tire advertising information 706 is displayed.

Following display of the selected advertising information 706, the viewer is provided with two selections, but the embodiment is not so limited. The viewer may dismiss the advertising information, wherein the advertising information is removed from the program broadcast. Furthermore, the viewer may store the advertising information, wherein the advertising information is stored in a buffer or register for later retrieval and removed from the program broadcast.

Figure 8:
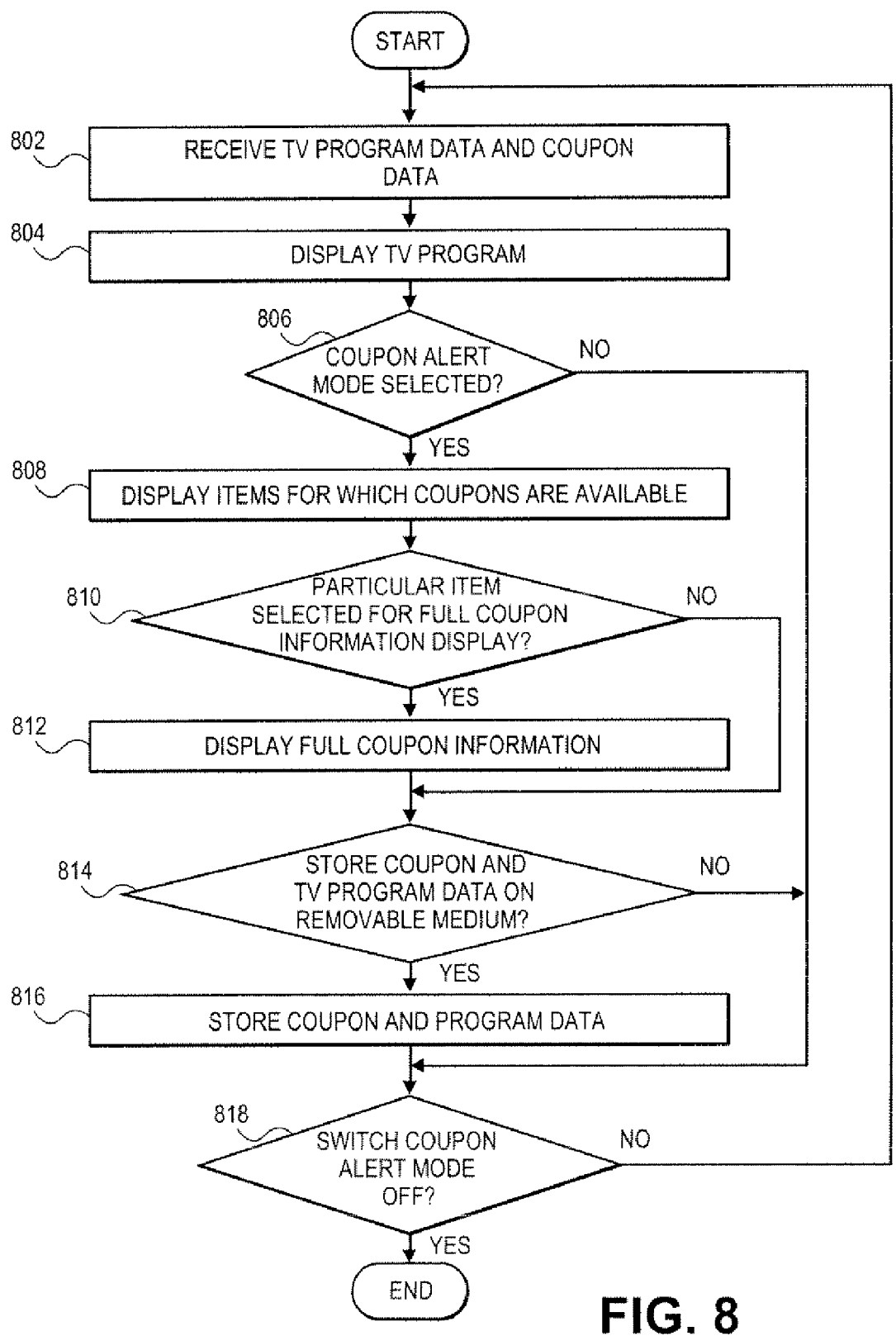
FIG. 8 is a flowchart of a method for providing electronic coupons of one embodiment of the present invention.

In addition to the on-demand advertising information, a broadcast system viewer may be presented with electronic coupon information. FIG. 8 is a flowchart of a method for providing electronic coupons of one embodiment of the present invention. Operation begins at step 802, at which coupon information is received along with broadcasts of associated television programs. According to one aspect of the invention, coupon information is provided for items comprising products and services. The products and services may be used in scenes of live and prerecorded television programs and live and prerecorded television commercials, wherein the scenes comprise currently displayed scenes, previously displayed scenes, and scenes that are to be displayed in the future, but the embodiment is not so limited. The coupon information may be received simultaneously with the scenes in which the identified items corresponding to the coupon information appear, but the embodiment is not so limited. Furthermore, the coupon information may be received prior to receipt of the scenes or television programs in which the identified items corresponding to the coupon information appear, in which case the coupon information is stored along with timing data that links the coupon information to the corresponding scene or program. The television program is displayed, at step 804.

In accessing the coupon information, one of a number of display modes are selected by a viewer or user. The display modes of one embodiment comprise a coupon mode, a stored coupon mode, and a non-coupon mode, but the embodiment is not so limited. The coupon mode enables display of the coupon information. The stored coupon mode results in the storing of the coupon information for presentation at a later time. The non-coupon mode prevents display of the coupon information. A determination is made, at step 806, whether a coupon mode is selected. If a coupon mode is not selected, operation continues at step 818.

If a coupon mode is selected, operation continues at step 808, at which the viewer is alerted when coupon information is available. The viewer alert comprises a tone and at least one displayed mark, wherein the displayed marks may be superimposed over the broadcast of the television program on the screen, but the embodiment is not so limited. The displayed marks of one embodiment comprise an indicator for each item for which coupon data is available, and the indicators may be representative of the items to which the indicators correspond, but the embodiment is not so limited.

Operation continues at step 810, at which the coupon information for a particular item may be selected, or requested, when the viewer selects the indicator corresponding to the item in which the viewer is interested. The selection may be performed using a cursor or pointer, but the embodiment is not so limited. If coupon information is selected for display by the viewer, operation continues at step 812, at which the full coupon information is displayed on the display along with the broadcast of the currently selected television program. The coupon information may be displayed by superimposing the information over the broadcast of the television program on the screen, but the embodiment is not so limited. Furthermore, the coupon information may be displayed on a portion of the display along with the television program broadcast, wherein either the coupon information or the television program is displayed on a picture-in-a-picture inset, but the embodiment is not so limited. Following display of the full coupon information at step 812, operation continues at step 814.

If coupon information is not selected for display by the viewer, operation continues at step 814, at which coupon information for particular items may be stored on a removable recording medium. If the coupon information is not selected for storage, operation continues at step 818. If the coupon information is selected for storage, operation continues at step 816, at which the coupon information is stored on the removable recording medium. The removable recording medium comprises integrated circuit cards, or "smart" cards, magnetic medium, and optical medium. In an alternate embodiment, the coupon information may be provided to a system printer, wherein the system printer provides a printed coupon that may be redeemed by the viewer.

In one embodiment, data corresponding to the television program with which the coupon information is associated is stored on the removable recording medium along with the coupon information. The data corresponding to the television program comprises, but is not limited to, the program title, the program description, the date of airing, the time of airing, and the channel on which the program is aired.

Following storage, a determination is made as to whether the coupon mode remains selected. If a coupon mode remains selected, operation continues at step 802 and proceeds as previously detailed. If the coupon modes are deselected, operation ends as selection of the non-coupon mode prevents the display of coupon information to the viewer.

In one embodiment, the coupon information is redeemed by the viewer when the stored coupon information is read from the removable recording medium by a merchandise retailer or dealer. Furthermore, the data corresponding to the television program may be read from the removable recording medium by the merchandise retailer, but the embodiment is not so limited. In an alternate embodiment, the coupon information is redeemed by the viewer via an electronic link established with a merchandise retailer or dealer, wherein the electronic link allows the merchandise retailer to read the stored coupon information from the recording medium of the viewer at such time as the viewer electronically orders or purchases merchandise. The electronic link may allow the merchandise retailer to read the data corresponding to the television program; an alternative, however, establishes a second electronic link between the viewer's system and the collection center, wherein the collection center reads the data corresponding to the television program using this second electronic link. The data corresponding to the television program is electronically transferred to a collection center for statistical television data, but the embodiment is not so limited. The electronic transfer of the data corresponding to the television program may occur between the viewer's system and the collection center or between the retailer's system and the collection center, but the embodiment is not so limited.

At least one condition precedent may require satisfaction prior to allowing redemption of coupon information by the viewer. For example, a viewer may be required to watch a particular program or combination of programs as a condition precedent to using selected coupon information. In one embodiment, the condition precedent is required to be satisfied prior to allowing the storing of selected coupon data on the removable recording medium. In an alternate embodiment, the coupon information is stored on the removable recording medium, and the condition precedent is required to be satisfied prior to allowing the coupon data to be read by the merchandise retailer or dealer.

Figure 9:
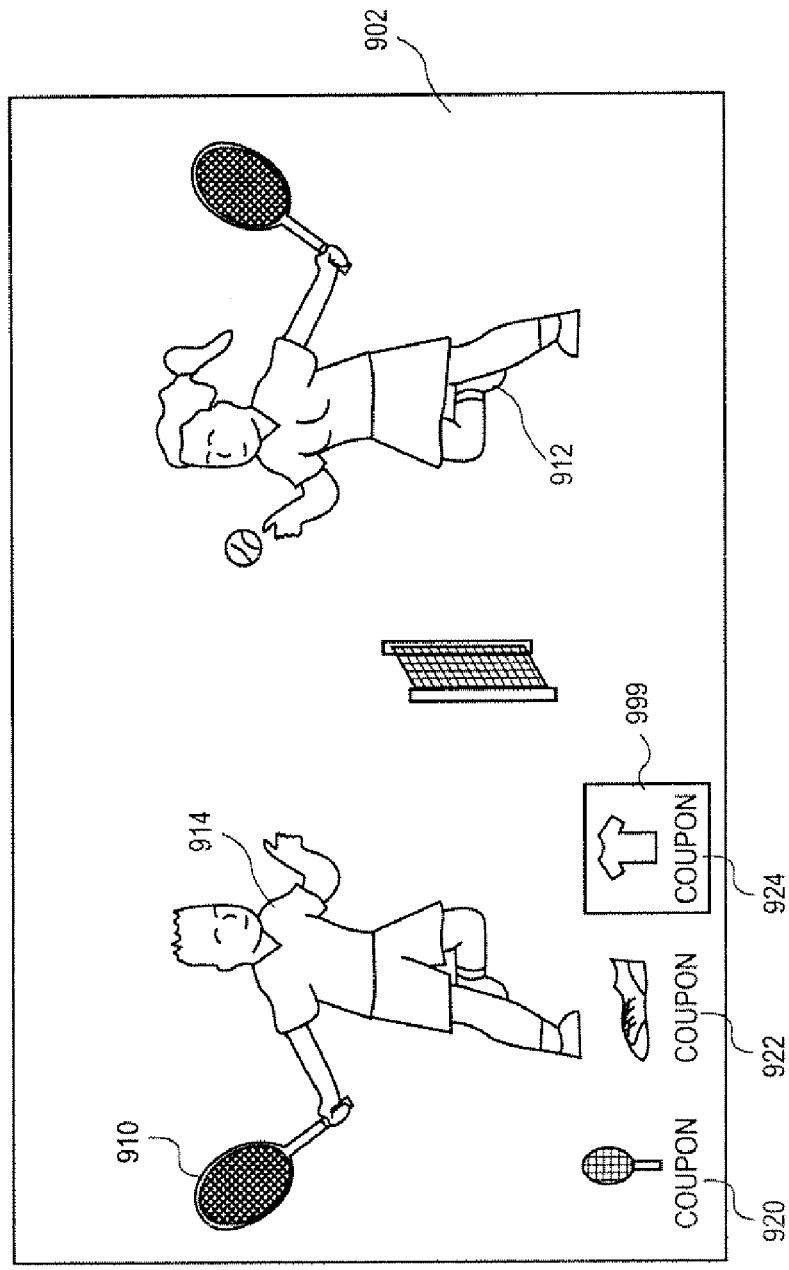
FIG. 9 is a television program scene displayed along with coupon information alerts of one embodiment of the invention.

FIG. 9 is a television program scene 902 displayed along with coupon information alerts 920-922 of one embodiment of the invention. In one embodiment, the broadcasting system comprises three operating modes, but the embodiment is not so limited. A first mode, the coupon mode, enables the display of coupon information and corresponding coupon alerts, but the embodiment is not so limited. A second mode, the stored coupon mode, causes the received coupon information to be stored for later retrieval, but the embodiment is not so limited. The stored coupon mode causes coupon information received both simultaneously and prior to receipt of the corresponding scene or program to be stored. As coupon information received prior to the time of the corresponding scene or program broadcast time comprises timing data that links the coupon information to the corresponding scene or program, the timing data is stored along with the coupon information. The stored coupon information may be recalled and viewed at a time that is different from a display time of a scene in which the corresponding advertised item appears. A third mode, the non-coupon mode, prevents the display of coupon information and corresponding coupon alerts, but the embodiment is not so limited.

In the example that follows, the coupon mode is selected in the broadcasting system, thereby enabling the display of coupon information, but the embodiment is not so limited. The program scene 902 is one in which two actors are enjoying a game of tennis. The program scene 920 may be from a live television program or a prerecorded television program, but the embodiment is not so limited. In one embodiment, coupon information is provided for numerous items 910-914 present in the program scene 902, as indicated by the displayed coupon marks 920-924; however, coupon information may be provided for items that are not present in the program scene 902. When coupon information is available for a particular item, a corresponding coupon mark will be displayed on the screen. The coupon mark may be accompanied by a viewer-controlled alert tone, but the embodiment is not so limited. The displayed coupon marks may be superimposed over the program scene on any portion of the display screen, but the embodiment is not so limited. In an alternate embodiment, a portion of the display screen is allocated to contain the displayed coupon marks, but the embodiment is not so limited.

In one embodiment, the coupon marks are representative of the items to which the marks correspond. For example, the coupon marks may be some combination of alphanumerics and icons representative of the item, but the embodiment is not so limited. The coupon information for a particular item is selected for display by moving a cursor 999 or other pointer to the corresponding coupon mark and selecting the mark. The cursor control comprises a remote control device and a mouse, but the embodiment is not so limited. The coupon information displayed for an item may comprise, but is not limited to, manufacturer's information, dealer information, service information, specification information, cost information, redemption information, and dates of validity. In one embodiment, the coupon information may comprise electronic catalogs that contain information on additional products and services offered by the particular manufacturer and dealer and service provider, electronic links to electronic catalogs, electronic links to product manufacturers and dealers that comprise electronic mail and voice messaging links, and electronic links over the Internet to the Web pages of product manufacturers and dealers, but the embodiment is not so limited.

In the displayed program scene 902, for example, coupon information is available for the tennis rackets 910, the shoes 912, and the clothing 914. Coupon information is available for the tennis racket 910 by selecting the corresponding tennis racket icon coupon mark 920. Coupon information is available for the shoes 912 by selecting the corresponding shoe icon coupon mark 922. Coupon information is available for the clothing 914 by selecting the corresponding clothing icon coupon mark 924.

As an alternative to providing a coupon mark for each item for which coupon information is available, coupon marks may be displayed for general categories of items. For example, all clothing items of a scene for which coupon information is available may be grouped together to be accessed using one general clothing icon, but the embodiment is not so limited. Selecting the clothing icon results in a display comprising a list of each clothing item for which coupon information is available. Selecting an article of clothing from the list results in display of the specific coupon information pertaining to the selected article of clothing.

In another alternate embodiment, a single generic coupon mark may be used to indicate that coupon information is available for at least one item of a scene. Selecting the coupon mark with a cursor or pointing device presents a list of items superimposed over the displayed program broadcast for which coupon information is available. The viewer may then move the cursor to highlight particular items of interest, whereupon selection of a particular item results in a second display comprising particular coupon information about that product.

Figure 10:
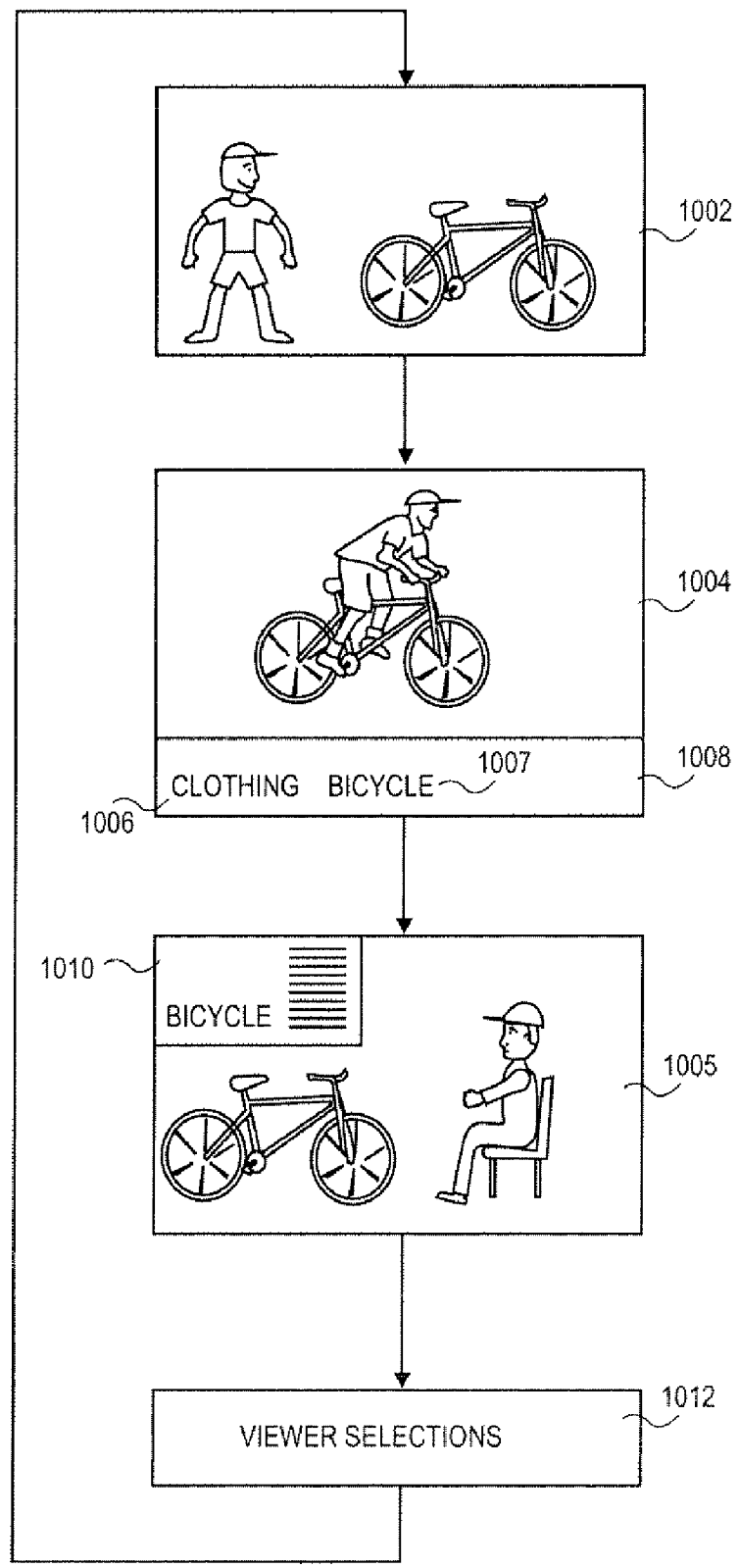
FIG. 10 is a sequence of displays of program scenes displayed along with coupon information alerts and coupon information of one embodiment of the invention.

FIG. 10 is a sequence of displays of program scenes displayed along with coupon information alerts and coupon information of one embodiment of the invention. The first program scene 1002 depicts an actor and a bicycle. When the coupon mode is selected, in the second display 1004, coupon marks "CLOTHING" 1006 and "BICYCLE" 1007 are displayed in a portion of the screen 1008 reserved for coupon marks. Alternatively, the coupon marks 1006-1007 could be superimposed over the program broadcast on the screen. The coupon marks are placed at any location on the screen as selected by the viewer, but the embodiment is not so limited. In a system in which a coupon mark is displayed for each item for which available, the coupon marks 1006-1007 indicate coupon information is available for the clothing and the bicycle. In a system in which a generic coupon mark is displayed for a category of goods and services, the coupon mark indicates coupon information is available for goods and services that are associated with the category.

Following selection of the bicycle coupon mark 1007, the corresponding advertising information 1010 is displayed. The display of the coupon information 1010 comprises superimposing the coupon information over the display of the program broadcast and displaying the coupon information 1010 in a prespecified or selected portion of the screen, but the embodiment is not so limited. Following display of the coupon information 1010, the viewer is provided with two selections 1012, but the embodiment is not so limited. For a first selection, the viewer may dismiss the coupon information, wherein the coupon information is removed from the program broadcast. For a second selection, the viewer may store the coupon information, wherein the coupon information is stored on a removable recording medium.

Figure 11:
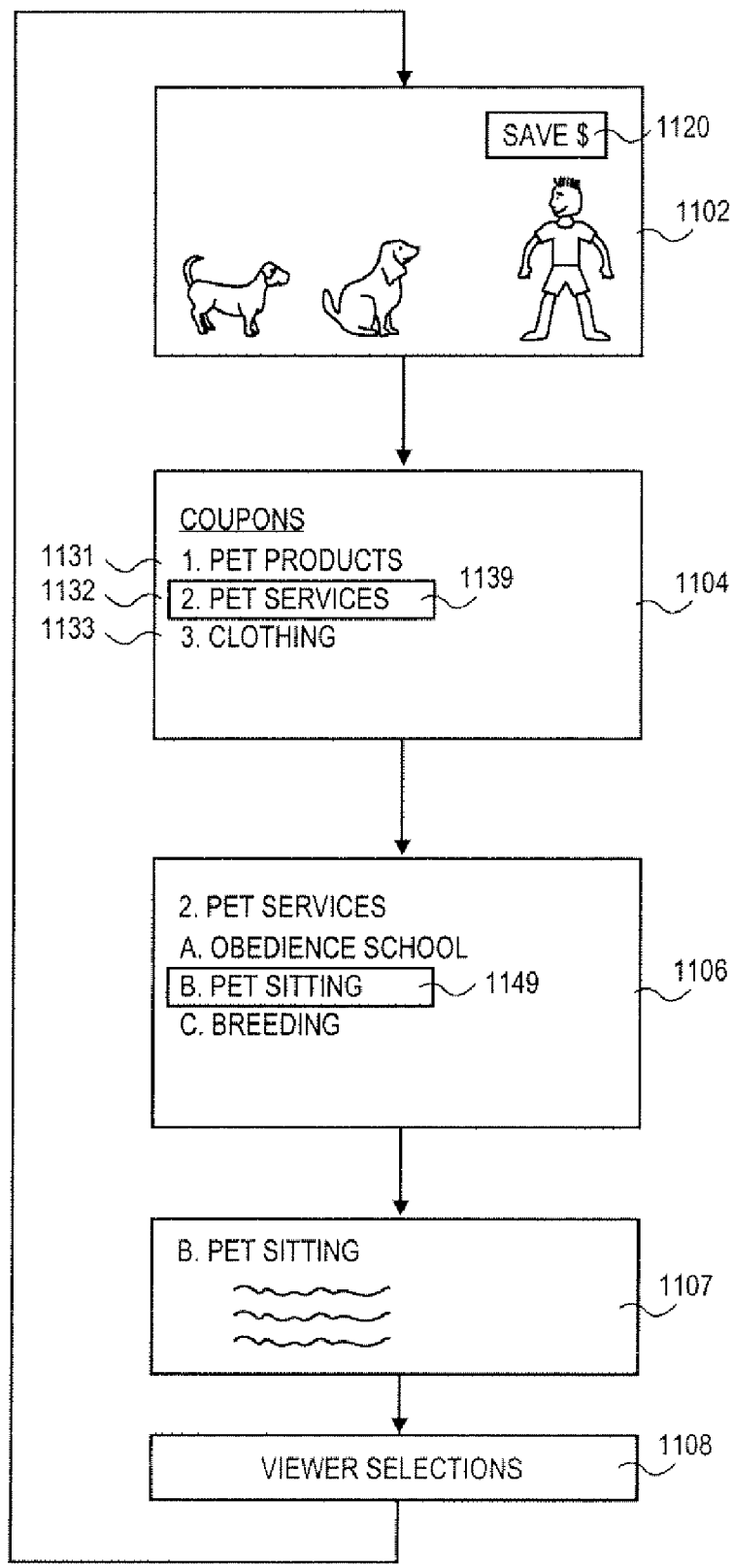
FIG. 11 is a sequence of displays comprising program scenes displayed along with coupon information alerts and coupon information of an alternate embodiment of the invention.

FIG. 11 is a sequence of displays comprising program scenes displayed along with coupon information alerts and coupon information of an alternate embodiment of the invention. The first display 1102 depicts a person with two dogs. This example details a system in which a generic coupon mark is displayed to indicate the availability of coupon information for at least one of the goods and services depicted in a program scene, but the embodiment is not so limited. When the coupon mode is selected, a coupon mark in the form of a general icon "SAVE $" 1120 is displayed in a portion of the screen reserved for the coupon mark. Alternatively, the coupon mark 1120 may be superimposed over the program broadcast on the screen. The coupon mark is placed at any location on the screen as selected by the viewer, but the embodiment is not so limited.

Following selection of the coupon mark 1120, the corresponding coupon information 1104 is displayed. The display of the coupon information 1104 comprises superimposing the coupon information over the display of the program broadcast 1102 and displaying the coupon information 1104 in a prespecified or selected portion of the screen, but the embodiment is not so limited. The coupon information 1104 comprises information for pet products 1131, pet services 1132, and clothing 1133, but the embodiment is not so limited. A viewer-controlled cursor 1139 or pointer is used to select coupon information on the pet services 1132. Upon selection, the pet services 1106 are displayed for which coupon information is available. The cursor 1149 is used to select coupon information on pet sitting, where upon selection the coupon information on pet sitting 1107 is displayed.

Following display of the selected advertising information 1106, the viewer is provided with two selections 1108, but the embodiment is not so limited. As a first selection, the viewer may dismiss the coupon information, wherein the coupon information is removed from the program broadcast. As a second selection, the viewer may store selected coupon information, wherein the selected coupon information is stored on a removable recording medium. The coupon information on the removable recording medium may be redeemed by the viewer either using an electronic link or by presenting the removable recording medium to a retailer or dealer for reading, but the embodiment is not so limited.

The invention has been described in conjunction with the preferred embodiment. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A method for providing electronic coupons comprising:
enabling selection of one of a plurality of display modes, wherein the plurality of display modes comprises a coupon mode and a non-coupon mode;
receiving a program and coupon information associated with an item in the program;
alerting a viewer that the coupon information is available if the coupon mode is selected and outputting the coupon information along with the program to the viewer; and
outputting the program to the viewer without alerting the viewer that the coupon information is available if the non-coupon mode is selected.

2. The method of claim 1, wherein the program comprises a broadcast television program.

3. The method of claim 2, wherein the item is associated with at least one scene of the broadcast television program.

4. The method of claim 1, wherein the plurality of display modes further comprises a stored coupon mode, and wherein if the stored coupon mode is selected, then the received coupon information is stored and later output at a time that is different from a time the program is received.

5. The method of claim 4, further comprising:
storing the coupon information for a specified period of time after the program ends; and
enabling the viewer to output the stored coupon information during the specified period of time.

6. The method of claim 1, wherein alerting the viewer comprises outputting a displayed mark, and wherein the displayed mark comprises a coupon indicator for the coupon.

7. The method of claim 6, wherein the displayed mark is superimposed over the output of the program on a display.

8. The method of claim 1, wherein alerting the viewer comprises outputting an audible signal.

9. The method of claim 6, wherein the coupon information is output in response to a selection of the displayed mark.

10. The method of claim 1, further comprising:
storing selected coupon information on a recording medium; and
storing data corresponding to the program on the recording medium, wherein the data corresponding to the program comprises one or more of a program title, a program description, a date of airing, a time of airing, and a channel of airing.

11. The method of claim 10, further comprising:
reading the coupon information from the recording medium;
reading the data corresponding to the program from the recording medium; and
transferring the data corresponding to the program read from the recording medium to a collection center for statistical program data.

12. The method of claim 1, further comprising:
storing selected coupon information on a recording medium; and
reading the stored coupon information using an electronic link established with a vendor that offers the item for sale, wherein the electronic link allows the vendor to read the coupon information from the recording medium at a time the item is electronically purchased.

13. The method of claim 1, wherein outputting the coupon information comprises displaying the coupon information on a portion of display, and wherein the portion of the display is selectable by a viewer.

14. The method of claim 1, wherein the coupon information comprises an electronic link to at least one of a manufacturer of the item and a vendor that is offering the item for sale, wherein the or each electronic link comprises a link to at least one of web pages and electronic catalogs.

15. The method of claim 2, wherein the coupon information is received simultaneously with the broadcast of the television program.

16. The method of claim 2, wherein the coupon information is received prior to receiving the broadcast of the television program, and wherein the prior received coupon information is stored.

17. A broadcasting system comprising:
a display device;
a processor coupled to the display device, the processor configured to control the system to provide electronic coupons by,
enabling selection of one of a plurality of display modes, wherein the plurality of display modes comprises a coupon mode and a non-coupon mode;
receiving a program and coupon information associated with an item in the program;
alerting a viewer that the coupon information is available if the coupon mode is selected and outputting the coupon information along with the program to the viewer, and
outputting the program to the viewer without alerting the viewer that the coupon information is available if the non-coupon mode is selected.

18. The system of claim 17, wherein the plurality of display modes further comprises a stored coupon mode, and wherein if the stored coupon mode is selected, then the received coupon information is stored and later output at a time that is different from a time the program is received.

19. A computer readable medium containing executable instructions which, when executed in a processing system, causes the system to perform a method for providing electronic coupons, the method comprising:
enabling selection of one of a plurality of display modes, wherein the plurality of display modes comprises a coupon mode and a non-coupon mode;
receiving a program and coupon information associated with an item in the program;
alerting a viewer that the coupon information is available if the coupon mode is selected and outputting the coupon information along with the program to the viewer; and
outputting the program to the viewer without alerting the viewer that the coupon information is available if the non-coupon mode is selected.

20. The computer readable medium of claim 19, wherein the plurality of display modes further comprises a stored coupon mode, and wherein if the stored coupon mode is selected, then the received coupon information is stored and later output at a time that is different from a time the program is received.

* * * * *

UNITED STATES PATENT AND TRADEMARK OFFICE
CERTIFICATE OF CORRECTION

PATENT NO.        : 7,493,636 B2                                    Page 1 of 1
APPLICATION NO.   : 11/186299
DATED             : February 17, 2009
INVENTOR(S)       : Kitsukawa et al.

It is certified that error appears in the above-identified patent and that said Letters Patent is hereby corrected as shown below:

Title Pg, Item (75) Inventors:
    Delete "Gong Szedo" and insert --Gong Szeto--.

Signed and Sealed this

Thirtieth Day of June, 2009

JOHN DOLL
*Acting Director of the United States Patent and Trademark Office*